US012620340B2

(12) United States Patent
Sung

(10) Patent No.: US 12,620,340 B2
(45) Date of Patent: May 5, 2026

(54) DISPLAY DEVICE AND METHOD OF DRIVING THE SAME, AND ELECTRONIC DEVICE

(71) Applicant: Samsung Display Co., LTD., Yongin-si (KR)

(72) Inventor: Jeongmin Sung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/922,906

(22) Filed: Oct. 22, 2024

(65) Prior Publication Data

US 2025/0292721 A1 Sep. 18, 2025

(30) Foreign Application Priority Data

Mar. 18, 2024 (KR) ........................ 10-2024-0037350

(51) Int. Cl.
*G09G 3/20* (2006.01)
*G09G 3/3233* (2016.01)
*G09G 3/32* (2016.01)

(52) U.S. Cl.
CPC ......... *G09G 3/2096* (2013.01); *G09G 3/3233* (2013.01); *G09G 3/32* (2013.01); *G09G 2300/0819* (2013.01); *G09G 2300/0842* (2013.01); *G09G 2300/0861* (2013.01); *G09G 2310/08* (2013.01); *G09G 2320/0238* (2013.01); *G09G 2330/021* (2013.01); *G09G 2340/0435* (2013.01)

(58) Field of Classification Search
CPC ...... G09G 3/2096; G09G 3/3233; G09G 3/32; G09G 2300/0819; G09G 2300/0842; G09G 2300/0861; G09G 2310/08; G09G 2320/0238; G09G 2330/021; G09G 2340/0435
USPC .......................................................... 345/204
See application file for complete search history.

(56) References Cited

U.S. PATENT DOCUMENTS 6,731,293 B2 5/2004 Tojima et al.
10,796,632 B2 10/2020 Sung et al.
11,881,134 B2 * 1/2024 Jeong ..................... H04N 5/144
2010/0020230 A1 * 1/2010 Suzuki .................. G06F 3/1415
348/E7.003
2013/0278569 A1 * 10/2013 Choi ...................... G09G 5/003
345/204
2016/0286155 A1 * 9/2016 Bhuvanagiri .......... H04N 23/63
2021/0193047 A1 * 6/2021 Kwon .................. G09G 3/3258
2023/0077843 A1 * 3/2023 Xin ........................ G09G 5/363
345/545
2024/0021142 A1 * 1/2024 Tian ..................... G09G 3/3233
(Continued)

FOREIGN PATENT DOCUMENTS

KR 100482493 B1 4/2005
KR 102303217 B1 9/2021
(Continued)

*Primary Examiner* — Tom V Sheng
(74) *Attorney, Agent, or Firm* — CANTOR COLBURN LLP

(57) ABSTRACT

A display device includes a pixel unit including pixels connected to data lines and scan lines, and a timing controller for comparing input numbers of commands included in command data with threshold values which corresponds to the input numbers, and shifting or maintaining a frame, which corresponds to a comparison result.

20 Claims, 9 Drawing Sheets

(56) References Cited

U.S. PATENT DOCUMENTS

| | | | | |
|---|---|---|---|---|
| 2024/0379044 | A1* | 11/2024 | Oh | G09G 3/3233 |
| 2025/0201191 | A1* | 6/2025 | Ji | G09G 3/3233 |

FOREIGN PATENT DOCUMENTS

| | | | |
|---|---|---|---|
| KR | 102370340 | B1 | 3/2022 |
| KR | 102419927 | B1 | 7/2022 |
| WO | 2016126100 | A1 | 8/2016 |
| WO | 2017210615 | A1 | 12/2017 |

* cited by examiner

SLi: SL1i, SL2i, SL3i, SL4i

DISPLAY DEVICE AND METHOD OF DRIVING THE SAME, AND ELECTRONIC DEVICE

This application claims priority to Korean Patent Application No. 10-2024-0037350, filed on Mar. 18, 2024, and all the benefits accruing therefrom under 35 U.S.C. § 119, the content of which in its entirety is herein incorporated by reference.

BACKGROUND

1. Technical Field

The present invention generally relates to a display device, and more particularly to a display device and a method of driving the same, and an electronic device.

2. Description of the Related Art

With the development of information technologies, the importance of a display device, which is a connection medium between a user and information, increases. Accordingly, display devices such as a liquid crystal display device and an organic light emitting display device are increasingly used.

Images of various contents may be displayed by such a display. For example, various types of images such as still images, web pages, movies, and games may be displayed by the display device. When a still image is displayed by the display device, frequent frame shifts are not required. On the other hand, when a movie, a game or the like is displayed by the display device, frequent frame shifts are required.

SUMMARY

Embodiments of the invention provide a display device, a method of driving the display device, and an electronic device, which can minimize power consumption when being driven at various image refresh rates.

In accordance with an aspect of the invention, there is provided a display device which includes a pixel unit including pixels connected to data lines and scan lines and a timing controller configured to compare input numbers of commands included in command data with threshold values that correspond to the input numbers, and shift or maintain a frame, corresponding to a comparison result.

In an embodiment, when a first command is input, the timing controller may not shift the frame when an input number of the first command is not equal to a first threshold value corresponding to the first command.

In an embodiment, the timing controller may shift a frame, corresponding to a predetermined planned driving frequency, and reflect the first command when the frame is shifted.

In an embodiment, when a first command is input, the timing controller may shift the frame such that the first command is reflected when an input number of the first command is equal to a first threshold value corresponding to the first command.

In an embodiment, the commands may include at least one of a dimming level change command which corresponds to a maximum luminance change of the pixel unit, a frame variable command which corresponds to a frame shift, a gamma change command which corresponds to a gamma voltage change, and a sleep mode command which corresponds to a low power mode.

In an embodiment, the timing controller may include a command sensor configured to receive the command data and input data, and sense the commands included in the command data and a frequency/luminance controller configured to shift or maintain the frame, which corresponds to a first command control signal or a second command control signal and which is supplied from the command sensor.

In an embodiment, the command sensor may include a storage unit configured to store count values and the threshold values, which correspond to the input numbers of the commands, a counter configured to increase a count value which corresponds to each of the commands when the commands are input and a controller configured to compare the count values which corresponds to the respective commands with the corresponding threshold values, and output the first command control signal or the second command control signal, which corresponds to a comparison result.

In an embodiment, the controller may compare a first count value corresponding to a first command included in the commands with a first threshold value corresponding to the first command when the first command is input. The controller may output the first command control signal when the first count value is less than the first threshold value and output the second command control signal when the first count value and the first threshold value are the same.

In an embodiment, the frequency/luminance controller may not shift the frame when the first command control signal is input.

In an embodiment, the frequency/luminance controller may shift a frame, corresponding to a predetermined planned driving frequency when the first command control signal is input, and reflect the first command when the frame is shifted.

In an embodiment, the frequency/luminance controller may reflect the first command while shifting a frame when the second command control signal is input.

In an embodiment, the controller may initialize the first count value when the second command control signal is output.

In an embodiment, the display device may further include a data driver configured to drive the data lines, under the control of the timing controller and a scan driver configured to drive the scan lines under the control of the timing controller.

In accordance with another aspect of the invention, there is provided a method of driving a display device, wherein the method includes inputting a first command to a timing controller, comparing an input number of the first command with a first threshold value and shifting a frame of the display device when the input number of the first command and the first threshold value are the same, and not shifting the frame in other cases.

In an embodiment, when the first command and the first threshold value are not the same, the timing controller may shift the frame, which corresponds to a predetermined planned driving frequency, and reflect the first command when the frame is shifted.

In an embodiment, the method may further include initializing the input number of the first command when the input number of the first command and the first threshold value are the same.

In an embodiment, the first threshold value may be stored in a storage unit of the timing controller, and may be changeable by an external processor.

In accordance with still another aspect of the invention, there is provided an electronic device including a display module configured to display a predetermined image, an auxiliary processor configured to control the display module and a processor configured to command data to the auxiliary processor, wherein the auxiliary processor compares input numbers of commands included in command data with threshold values which correspond to the input numbers, and shifts or maintains a frame of the display module, which corresponds to a comparison result.

In an embodiment, when a first command is input, the auxiliary processor may shift a frame, which corresponds to a predetermined planned driving frequency when an input number of the first command and a first threshold value which corresponds to the first command are not the same, and reflect the first command when the frame is shifted.

In an embodiment, when a first command is input, the auxiliary processor may reflect the first command while shifting a frame when an input number of the first command and a first threshold value which corresponds to the first command are the same.

BRIEF DESCRIPTION OF THE DRAWINGS

Example embodiments will now be described more fully hereinafter with reference to the accompanying drawings. However, the invention may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being disposed "between" two elements, it can be the only element between the two elements, or one or more intervening elements may also be present. Like reference numerals refer to like elements throughout.

DETAILED DESCRIPTION

Figure 1:
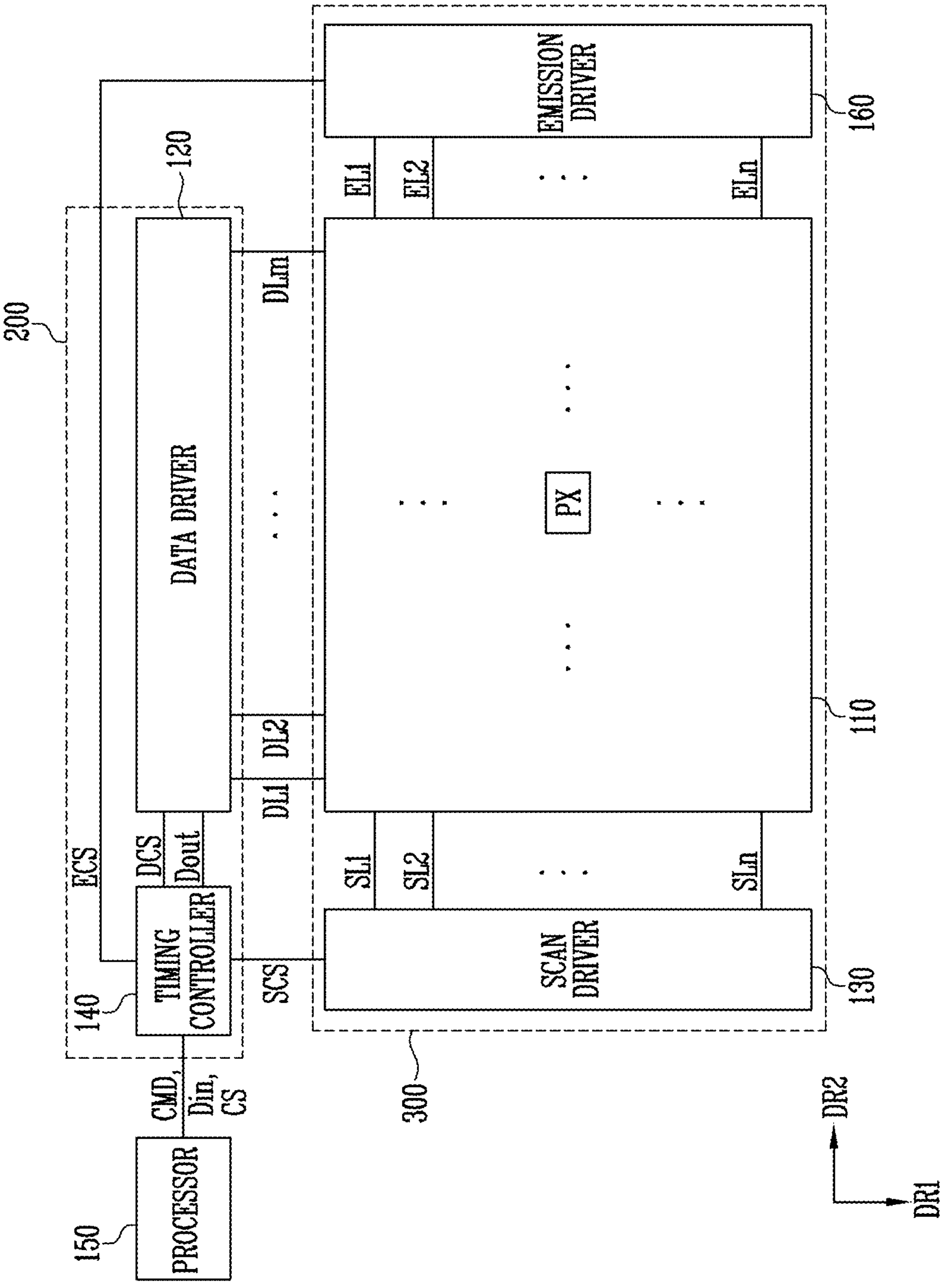
FIG. 1 is a schematic block diagram illustrating a display device, in accordance with an embodiment.

Hereinafter, exemplary embodiments are described in detail with reference to the accompanying drawings so that those skilled in the art may easily practice the invention. The invention may be implemented in various different forms and is not limited to the embodiments described herein.

A part irrelevant to the description will be omitted to clearly describe the invention, and the same or similar constituent elements will be designated by the same reference numerals throughout the specification. Therefore, the same reference numerals may be used in different drawings to identify the same or similar elements.

In the description, the expression "equal" may mean "substantially equal." That is, this may mean equality to a degree to which those skilled in the art can understand the equality. Other expressions may be expressions in which "substantially' is omitted.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the present disclosure, and may be selectively driven by firmware and/or software. In addition, each block, each unit, and/or each module may be implemented by dedicated hardware or by a combination of dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the invention. Also, in some embodiments, the blocks, the units, and/or the modules may be physically separated into more complex blocks, more complex units, and/or more complex modules without departing from the scope of the invention.

The term "connection" between two components may include both electrical connection and physical connection, but the invention is not necessarily limited thereto. For example, the term "connection" used based on circuit diagrams may mean electrical connection, and the term "connection" used based on sectional and plan views may mean physical connection.

It will be understood that, although the terms "first," "second," etc. may be used herein to describe various elements, these elements should not be limited by these terms. These terms are only used to distinguish one element from another element. Thus, a "first" element discussed below could also be termed a "second" element without departing from the teachings of the invention.

Meanwhile, the invention is not limited to embodiments disclosed below and may be implemented in various forms.

Each embodiment disclosed below may be independently embodied or be combined with at least another embodiment prior to being embodied.

Throughout the specification, when it is described that an element is "connected" to another element, this includes not only being "directly connected", but also being "indirectly connected" with another device in between. The terms used herein are for the purpose of describing specific embodiments and are not intended to limit the scope of the invention. Throughout the specification, unless explicitly described to the contrary, the word "comprise" and variations such as "comprises" or "comprising" will be understood to imply the inclusion of stated elements but not the exclusion of any other elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms first, second, etc. may be used herein to describe various constituent elements, these constituent elements should not be limited by these terms. These terms are used to distinguish one constituent element from another constituent element. Thus, a first constituent element discussed below could be termed a second constituent element without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (for example, rotated 90 degrees or at other orientations), and, as such, the spatially relative descriptors used herein interpreted accordingly.

Various embodiments may be described herein with reference to sectional illustrations that are schematic illustrations of idealized embodiments. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

Like numbers refer to like elements throughout. In the drawings, the thickness of certain lines, layers, components, elements or features may be exaggerated for clarity. It will be understood that, although the terms "first", "second", etc. may be used herein to describe various elements, these elements should not be limited by these terms. These terms are only used to distinguish one element from another element. Thus, a "first" element discussed below could also be termed a "second" element without departing from the teachings of the invention.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

Hereinafter, embodiments of the invention will be described in detail with reference to the accompanying drawings.

FIG. 1 is a schematic block diagram illustrating a display device, in accordance with an embodiment of the invention.

In an embodiment and referring to FIG. 1, the display device may include a display driver 200 and a display unit 300.

The display driver 200 may control the display unit 300. To this end, the display driver 200 may include a timing controller 140 and a data driver 120. The display driver 200 may be configured with one IC or it may be configured with a plurality of ICs. The display unit 300 may display a predetermined image. To this end, the display unit 300 may include a pixel unit 110, a scan driver 130, and an emission driver 160.

In an embodiment, the timing controller 140 may receive, from a processor 150, input data Din corresponding to respective frames, control signals CS, and command data CMD (or command signals). The processor 150 may correspond to a Graphics Processing Unit (GPU), a Central Processing Unit (CPU), an Application Processor (AP), or the like.

The control signals CS may include various signals necessary for the driving of the display device. The input data Din may correspond to an image displayed by the pixel unit 110 and the command data CMD may include various commands necessary for control of the display device. In an example, a dimming level change command, a frame variable command (or refresh rate change command), a gamma change command, a mode (e.g., a sleep mode) change command, and the like may be included in the command data CMD.

In an embodiment, the dimming level change command may include a dimming level, where the dimming level may include a maximum display luminance with which the display device can emit light. For example, as the dimming level increases, the maximum display luminance with which an image can be displayed by the pixel unit 110 may increase. The maximum display luminance may be a luminance measured when the entire pixel unit 110 emits light with a maximum gray set in the display device.

In an embodiment, the frame variable command may correspond to a refresh rate (or driving frequency) change of the display device. When the input data Din is input together with the frame variable command, a refresh rate of the display device may be changed.

In an embodiment, the gamma change command may correspond to a change of a gamma voltage applied to the data driver 120. When the gamma voltage is changed, a display luminance of the pixel unit 110 may be changed. The mode change command may correspond to a driving mode change of the display device. In an embodiment, when the mode change command is input, the display device may be driven in a sleep mode, where the sleep mode may mean a low power mode.

In an embodiment, the timing controller 140 may realign the input data Din to be suitable for specifications of the display device. Also, the timing controller 140 may generate output data Dout by correcting the input data Din, and may supply the output data Dout to the data driver 120. In an example, the timing controller 140 may generate the output data Dout by correcting the input data Din, based on an optical measurement result.

In an embodiment, the timing controller 140 may generate a data driving signal DCS, a scan driving signal SCS, and an emission driving signal ECS, corresponding to the control signal CS and the command data CMD. The timing controller 140 may generate the data driving control signal DCS, the scan driving signal SCS, and the emission driving signal ECS such that the display device can be controlled corresponding to a command included in the command data CMD. The data driving signal DCS may be supplied to the data driver 120, the scan driving signal SCS may be supplied to the scan driver 130, and the emission driving signal ECS may be supplied to the emission driver 160.

The pixel unit 110 may include pixels PX disposed to be connected to scan lines SL1, SL2, . . . , and SLn (where n is a natural number of 3 or more) and data lines DL1, DL2, . . . , and DLm (where m is a natural number of 3 or more).

The data lines DL1 to DLm may be disposed to extend in a first direction DR1. The first direction DR1 may be, for example, a direction in which an upper side and a lower side of the pixel unit 110 are connected to each other. In another embodiment, the first direction DR1 may be a direction in which a left side and a right side of the pixel unit 110 are connected to each other, and which may be designated as a direction different from the direction.

In an embodiment, the scan lines SL1 to SLn may be disposed to extend in a second direction DR2, where the second direction DR2 may be a direction which is orthogonal to the first direction DR1. The second direction DR2 may be directed in a direction in which the left side and the right side of the pixel unit 110 are connected to each other. In another embodiment, the second direction DR2 may be a direction in which the upper side and the lower side of the pixel unit 110 are connected to each other, and may be designated as a direction that is different from the direction.

In an embodiment, a plurality of pixels PX may be disposed in the pixel unit 110 to be electrically connected to the data lines DL1 to DLm and the scan lines SL1 to SLn. The pixels PX may be sub-pixels. In an example, the pixels PX may be disposed in various manners currently known in the art.

Pixels PX may be selected in a unit of a horizontal line (e.g., pixels PX connected to the same scan line are sorted as one horizontal line (or pixel row)) when a scan signal is supplied to the scan lines SL1 to SLn. The pixels PX selected by the scan signal may be supplied with a data signal from a data line (any one of DL1 to DLm) connected thereto. The pixels PX supplied with the data signal may generate light with a predetermined luminance which corresponds to a voltage of the data signal.

In an embodiment, the data driver 120 may receive the output data Dout and the data driving signal DCS from the timing controller 140. The data driver 120 may generate a data signal, based on the data driving signal DCS and the output data Dout. In an example, the data driver 120 may generate an analog data signal, based on a grayscale of the output data Dout. The data driver 120 may supply a data signal in a unit of one horizontal period. A data enable signal necessary for driving of the data driver 120 may be included in the data driving signal DCS.

In an embodiment, the data enable signal may include an active period in which a plurality of pulses are supplied and a blank period in which a certain voltage (e.g., a low voltage) is maintained. The data driver 120 may be synchronized with the pulses of the data enable signal to supply a data signal to the data lines DL1 to DLm during the active period.

In an embodiment, the scan driver 130 may receive the scan driving signal SCS from the timing controller 140 and may supply a scan signal to the scan lines SL1 to SLn, wherein the scan signal corresponds to the scan driving signal SCS. In an example, the scan driver 130 may sequentially supply the scan signal to the scan lines SL1 to SLn.

Figure 2:
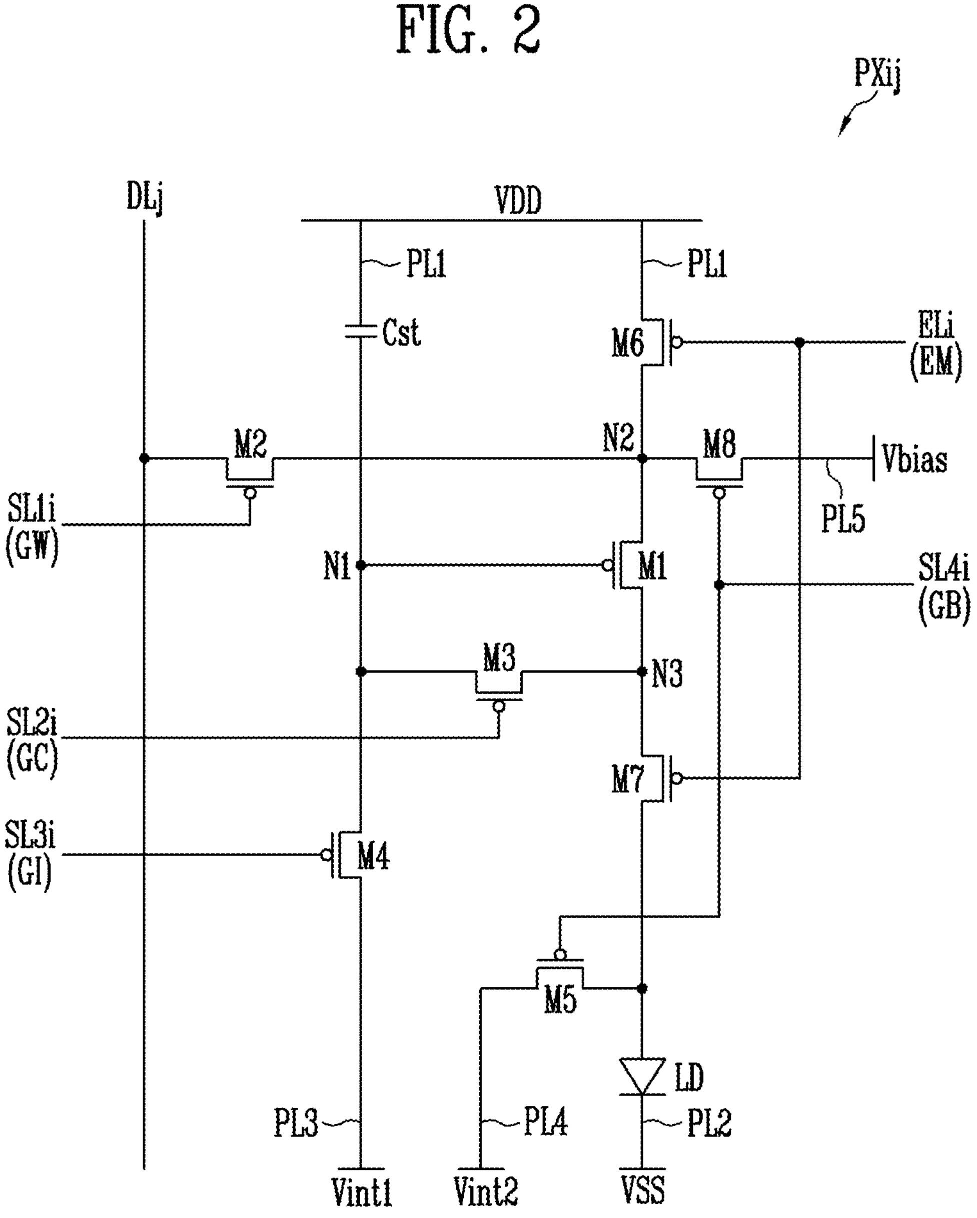
FIG. 2 is a schematic circuit diagram illustrating a pixel as shown in FIG. 1, in accordance with an embodiment.

Each of the scan lines SL1 to SLn may include a plurality of scan lines. In an example, as shown in FIG. 2, an ith scan line SLi may include a first scan line SL1*i*, a second scan line SL2*i*, a third scan line SL3*i*, and a fourth scan line SL4*i*. The scan driver 130 may supply a first scan signal GW to the first scan line SL1*i*, a second scan signal GC to the second scan line SL2*i*, a third scan signal GI to the third scan line SL3*i*, and a fourth scan signal GB to the fourth scan line SL4*i*.

To this end, the scan driver 130 may include a plurality of scan drivers for driving the respective scan lines SL1*i*, SL2*i*, SL3*i*, and SL4*i*. The plurality of scan drivers may be formed as one scan driver 130 as shown in FIG. 1 and be formed as separate drivers. In an example, some of the plurality of scan drivers may be disposed to be spaced apart from each other with the pixel unit 110 interposed therebetween.

In an embodiment, the scan driver 130 may be disposed as a separate Integrated Circuit (IC) in the display device. In another embodiment, the scan driver 130 may be formed together with the pixels PX in a process of forming the pixel unit 110. For example, in an embodiment, the scan driver 130 may be formed in an Oxide Semiconductor thin film transistor Gate driver circuit (OSG) type or an Amorphous Silicon thin film transistor Gate driver circuit (ASG) type in the pixel unit 110.

In an embodiment, the emission driver 160 may receive the emission driving signal ECS from the timing controller 140 and may supply an emission control signal to emission control lines EL1 to ELm, where the emission control signal corresponds to the emission driving signal ECS. In an example, the emission driver 160 may sequentially supply the emission control signal to the emission control lines EL1 to ELm.

In an embodiment, the emission driver 160 may be disposed as a separate IC in the display device. In another embodiment, the emission driver 160 may be formed together with the pixels PX in the process of forming the pixel unit 110. For example, the emission driver 160 may formed in the OSG type or the ASG type in the pixel unit 110.

In an embodiment, the display device may include a flat display device, a curved display device in which a portion of the pixel unit 110 is curved, a flexible display device in which a portion of the pixel unit 110 is folded or bent, and a stretchable display device in which a portion of the pixel unit 110 is expanded/contracted.

In an embodiment, the display device is a device which displays moving images or still images, and may include portable electronic devices such as a mobile phone, a smartphone, a tablet personal computer (PC), a smart watch, a watch phone, a portable multimedia player (PMP), a navigation system, and an ultra mobile computer (UMPC). In an embodiment, the display device may include electronic devices such as a television, a notebook computer, a monitor, an advertisement board, and Internet of things (IOT).

FIG. 2 is a circuit diagram illustrating an embodiment of the pixel shown in FIG. 1. For convenience of description, a pixel PXij located on an ith (where i is a natural number of n or less) horizontal line and a jth (where j is a natural number of m or less) vertical line is illustrated in FIG. 2.

In an embodiment and referring to FIG. 2, the pixel PXij may be connected to corresponding signal lines SL1*i*, SL2*i*, SL3*i*, SL4*i*, ELi, and DLj. For example, the pixel PXij may be connected to an ith first scan line SL1*i*, an ith second scan line SL2*i*, an ith third scan line SL3*i*, an ith fourth scan line SL4*i*, an ith emission control line ELi, and a jth data line DLj. In an embodiment, the pixel PXij may be further connected to a first power line PL1, a second power line PL2, a third power line PL3, a fourth power line PL4, and a fifth power line PL5.

In an embodiment, the pixel PXij may include a light emitting element LD and a pixel circuit for controlling an amount of current supplied to the light emitting element LD.

The light emitting element LD may be connected between the first power line PL1 and the second power line PL2. In an example, a first electrode (or anode electrode) of the light emitting element LD may be electrically connected to the first power line PL1 via a seventh transistor M7, a third node N3, a first transistor M1, a second node N2, and a sixth transistor M6, and a second electrode (or cathode electrode) of the light emitting element LD may be electrically connected to the second power line PL2. The light emitting element LD may generate light with a predetermined luminance which corresponds to an amount of current supplied from the first power line PL1 to the second power line Pl2 via the pixel circuit.

In an embodiment, the light emitting element LD may be selected as an organic light emitting diode. Also, in another embodiment, the light emitting element LD may be selected as an inorganic light emitting diode such as a micro LED (light emitting diode) or a quantum dot light emitting diode. Also, in still yet another embodiment, the light emitting element LD may be an element configured with a combination of an organic material and an inorganic material. In FIG. 2, it is illustrated that the pixel PXij includes a single light emitting element LD. However, in another embodiment, the pixel PXij may include a plurality of light emitting elements LD, where the plurality of light emitting elements LD may be connected in series, parallel or series/parallel to each other.

In an embodiment, the pixel circuit may include the first transistor M1, a second transistor M2, a third transistor M3, a fourth transistor M4, a fifth transistor M5, the sixth transistor M6, the seventh transistor M7, an eighth transistor M8, and a storage capacitor Cst.

A first electrode of the first transistor M1 (or driving transistor) may be connected to the second node N2, and a second electrode of the first transistor M1 may be connected to the third node N3. In addition, a gate electrode of the first transistor M1 may be connected to a first node N1. The first transistor M1 may control an amount of current supplied from a first driving power source VDD to a second driving power source VSS via the light emitting element LD corresponding to a voltage of the first node N1.

The second transistor M2 may be connected between the data line DLj and the second node N2. In addition, a gate electrode of the second transistor M2 may be electrically connected to a first scan line SL1*i* such that the second transistor M2 may be turned on when an enable first scan signal GW is supplied to the first scan line SL1*i*, to electrically connect the data line DLj and the second node N2 to each other. The enable first scan signal GW may have a voltage, e.g., a low voltage, at which the second transistor M2 can be turned on.

The third transistor M3 may be connected between the first node N1 and the third node N3. In addition, a gate electrode of the third transistor M3 may be electrically connected to the second scan line SL2*i* such that the third transistor M3 may be turned on when an enable second scan signal GC is supplied to the second scan line SL2*i*, to electrically connect the first node N1 and the third node N3 to each other. That is, when the third transistor M3 is turned on, the first transistor M1 may be diode-connected. The enable second scan signal GC may have a voltage, e.g., a low voltage, at which the third transistor M3 can be turned on.

A first electrode of the fourth transistor M4 may be connected to the first node N1, and a second electrode of the fourth transistor M4 may be electrically connected to the third power line PL3. In addition, a gate electrode of the fourth transistor M4 may be electrically connected to the third scan line SL3*i* such that the fourth transistor M4 may be turned on when an enable third scan signal GI is supplied to the third scan line SL3*i*, to supply a voltage of a first initialization power source Vint1 to the first node N1. The enable third scan signal GI may have a voltage, e.g., a low voltage, at which the fourth transistor M4 can be turned on.

A first electrode of the fifth transistor M5 may be connected to the first electrode of the light emitting element LD, and a second electrode of the fifth transistor M5 may be electrically connected to the fourth power line PL4. In addition, a gate electrode of the fifth transistor M5 may be electrically connected to the fourth scan line SL4*i* such that the fifth transistor M5 may be turned on when an enable fourth scan signal GB is supplied to the fourth scan line SL4*i*, to supply a voltage of a second initialization power source Vint2 to the first electrode of the light emitting element LD. The enable fourth scan signal GB may have a voltage, e.g., a low voltage, at which the fifth transistor M5 can be turned on.

In an embodiment, when the voltage of the second initialization power source Vint2 is supplied to the first electrode of the light emitting element LD, a parasitic capacitor of the light emitting element LD may be discharged. As a residual voltage charged in the parasitic capacitor of the light emitting element LD is discharged (or removed), unintended minute emission can be prevented. Thus, the black expression ability of the pixel PXij can be improved.

A first electrode of the sixth transistor M6 may be electrically connected to the first power line PL1, and a second electrode of the sixth transistor M6 may be connected to the second node N2. In an embodiment, a gate electrode of the sixth transistor M6 may be electrically connected to the emission control line ELi such that the sixth transistor M6 may be turned off when a disable emission control signal EM is supplied to the emission control line ELi, and be turned on when an enable emission control signal EM is supplied to the emission control line ELi. The disable emission control signal EM may have a voltage, e.g., a high voltage, at which the sixth transistor M6 can be turned off.

The seventh transistor M7 may be connected between the third node N3 and the first electrode of the light emitting element LD. In addition, a gate electrode of the seventh transistor M7 may be electrically connected to the emission control line ELi such that the seventh transistor M7 may be turned off when the disable emission control signal EM is supplied to the emission control line ELi, and be turned on when the enable emission control signal EM is supplied to the emission control line ELi.

A first electrode of the eighth transistor M8 (or bias transistor) may be electrically connected to the fifth power line PL5, and a second electrode of the eighth transistor M8 may be connected to the second node N2. In addition, a gate electrode of the eighth transistor M8 may be electrically connected to the fourth scan line SL4*i* such that the eighth transistor M8 may be turned on when the enable fourth scan signal GB is supplied to the fourth scan line SL4*i*, to electrically connect the fifth power line PL5 and the second node N2 to each other.

The storage capacitor Cst may be connected between the first power line pL1 and the first node N1 and may store a voltage applied to the first node N1.

In FIG. 2, an embodiment where the transistors M1 to M8 are implemented with a P-type transistor is illustrated. However, the invention is not limited thereto. In another embodiment, some transistors (e.g., M3 and M4) among the transistors M1 to M8 may be implemented with an N-type transistor.

Additionally, the structure of the pixel PXij, in accordance with the embodiment, is not limited to the embodiment shown in FIG. 2. In another embodiment, when the pixel PXij is driven to include a data writing period WP and an initialization period IP, which are described with reference to FIGS. 3A and 3B, the pixel PXij may be implemented with various types of circuits currently known in the art.

Figure 3A:
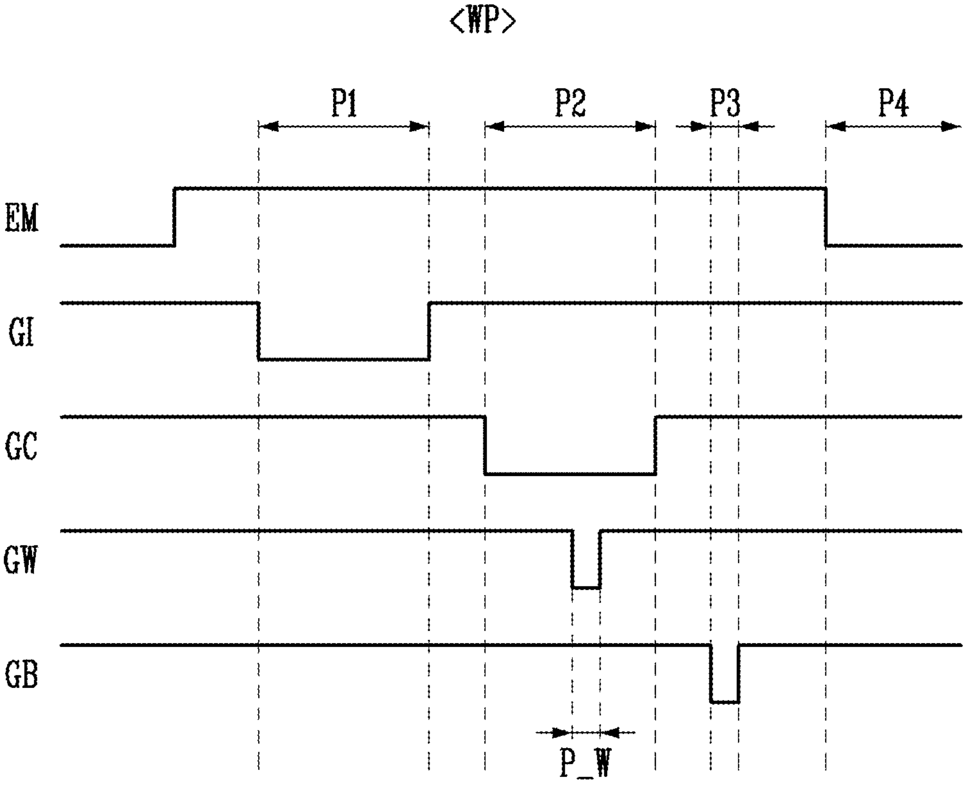
FIG. 3A is a waveform diagram illustrating a method of driving the pixel shown in FIG. 2 during a data writing period, in accordance with an embodiment.

FIG. 3A is a waveform diagram illustrating an embodiment of a method of driving the pixel shown in FIG. 2 during a data writing period, where the data writing period WP may include may be included in an active period of a frame.

In an embodiment and referring to FIGS. 2 and 3A, the data writing period WP may include a first period P1, a second period P2, a third period P3, and a fourth period P4, where the first period P1 to the third period P3 may be set as a non-emission period, and the fourth period P4 may be set as an emission period.

During the first period P1 to the third period P3, the disable emission control signal EM may be supplied to the emission control line ELi. When the disable emission control signal EM is supplied to the emission control line ELi, the sixth transistor M6 and the seventh transistor M7 may be turned off. When the sixth transistor M6 and the seventh transistor M7 are turned off, the electric connection between the first power line PL1 and the light emitting element LD may be blocked, and accordingly, the light emitting element LD may be set to be in a non-emission state.

During the first period P1, the enable third scan signal GI may be supplied to the third scan line SL3*i*. When the enable third scan signal GI is supplied to the third scan line SL3*i*, the fourth transistor M4 may be turned on and the voltage of the first initialization power source Vint1 from the third power line PL3 may be supplied to the first node N1. When the voltage of the first initialization power source Vint1 is supplied to the first node N1, the first transistor M1 may be set to be in a strong on-bias state.

During the second period P2, the enable second scan signal GC may be supplied to the second scan line SL2*i*, and accordingly, the third transistor M3 may be turned on. When the third transistor M3 is turned on, the first transistor M1 may be diode-connected.

In a writing period P_W which overlaps the second period P2, the enable first scan signal GW may be supplied to the first scan line SL1*i*. When the enable first scan signal GW is supplied to the first scan line SL1*i*, the second transistor M2 may be turned on and a data signal from the data line DLj may be supplied to the second node N2. Since the diode-connected form of the first transistor M1 is maintained by the turned-on third transistor M3, the first node N1 may have a voltage obtained by compensating for a threshold voltage of the first transistor M1 in the data signal.

During the third period P3, the enable fourth scan signal GB may be supplied to the fourth scan line SL4*i*. When the enable fourth scan signal GB is supplied to the fourth scan line SL4*i*, the fifth transistor M5 and the eighth transistor M8 may be turned on. When the fifth transistor M5 is turned on, the voltage of the second initialization power source Vint2 may be supplied to the first electrode of the light emitting element LD, and accordingly, the light emitting element LD may be initialized. When the eighth transistor M8 is turned on, a voltage of a bias power source Vbias may be supplied to the second node N2 and the first transistor M1 may be set to be in an on-bias state.

In the fourth period P4, as the enable emission control signal EM (or low-level emission control signal) may be supplied to the emission control line ELi, the sixth transistor M6 and the seventh transistor M7 may be turned on. When the sixth transistor M6 and the seventh transistor M7 are turned on, a current flowing path may be formed from the first power line PL1 to the second power line PL2 via the sixth transistor M6, the first transistor M1, the seventh transistor M7, and the light emitting element LD. A driving current corresponding to the voltage of the first node N1 may flow through the light emitting element LD according to an operation of the first transistor M1, and the light emitting element LD may emit light with a luminance corresponding to the driving current.

Figure 3B:
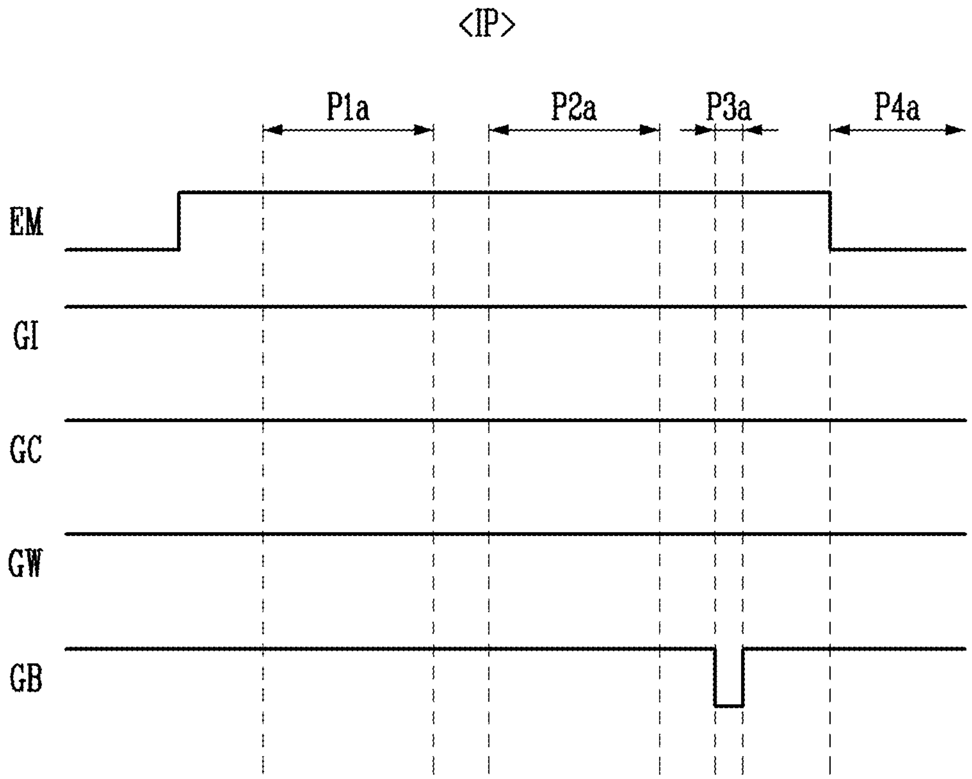
FIG. 3B is a waveform diagram illustrating a method of driving the pixel shown in FIG. 2 during an initialization period, in accordance with an embodiment.

FIG. 3B is a waveform diagram illustrating an embodiment of the method of driving the pixel shown in FIG. 2 during an initialization period. The initialization period IP is a period in which light is emitted while maintaining a voltage of a previously supplied data signal and may be a period in which an image is displayed without shifting any frame. In an embodiment, one frame may include one data writing period WP in an active period. In an embodiment, one frame may include at least one initialization period IP, corresponding to an image refresh rate. When a plurality of initialization periods IP are included in one frame, the plurality of initialization periods IP may be successively disposed after the data writing period WP.

In an embodiment, as compared with the data writing period WP, in the initialization period IP, a threshold voltage compensation operation and a data writing operation may be omitted, and an operation of applying a bias voltage to the first transistor M1 and an operation of initializing the light emitting element LD may be performed. The initialization period IP may be set to have a length similar to a length of the data writing period WP. The initialization period IP may include a first period P1*a*, a second period P2*a*, a third period P3*a*, and a fourth period P4*a*.

In an embodiment and referring to FIGS. 2 and 3B, in the first period P1*a* to the third period P3*a*, the disable emission control signal EM may be supplied to the emission control line ELi such that the sixth transistor M6 and the seventh transistor M7 may be turned off, and accordingly, the light emitting element LD may be set to be in the non-emission state.

In the first period P1*a* to the third period P3*a*, the enable first scan signal GW, the enable second scan signal GC, and the enable third scan signal GI may not be supplied (or disable scan signals GW, GC, and GI may be supplied). Accordingly, in the first period P1*a* to the third period P3*a*, the second transistor M2, the third transistor M3, and the fourth transistor M4 may be set to be in a turn-off state.

In the third period P3*a*, the enable fourth scan signal GB may be supplied to the fourth scan line SL4*i* such that the fifth transistor M5 and the eighth transistor M8 may be turned on.

When the fifth transistor M5 is turned on, the voltage of the second initialization power source Vint2 may be supplied to the first electrode of the light emitting element LD, and accordingly, the light emitting element LD may be initialized. When the eighth transistor M8 is turned on, the voltage of the bias power source Vbias may be supplied to the second node N2 such that the first transistor M1 may be set to be in the on-bias state.

As described above, since the one frame includes the data writing period WP and the initialization period IP, the display device 100, in accordance with an embodiment can be driven at various driving frequencies (various frame frequencies).

Figure 4:
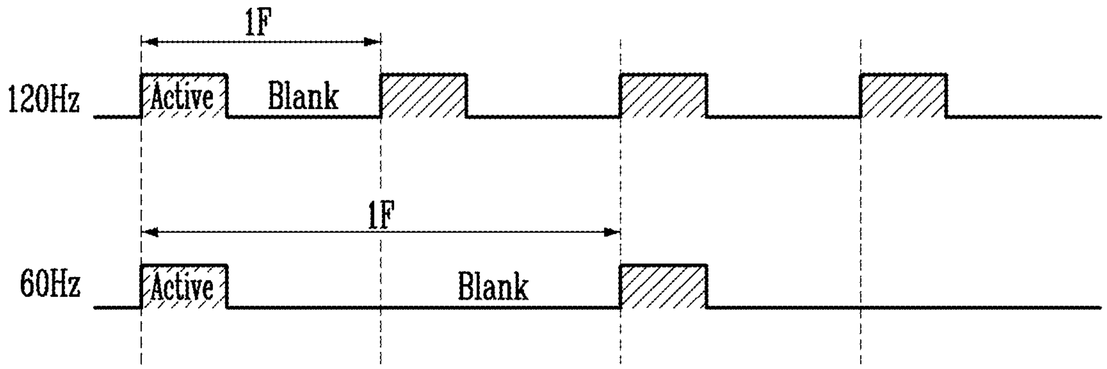
FIG. 4 is a frequency diagram illustrating an example of a blank period which corresponds to a refresh rate, in accordance with an embodiment.
Figure 5A:
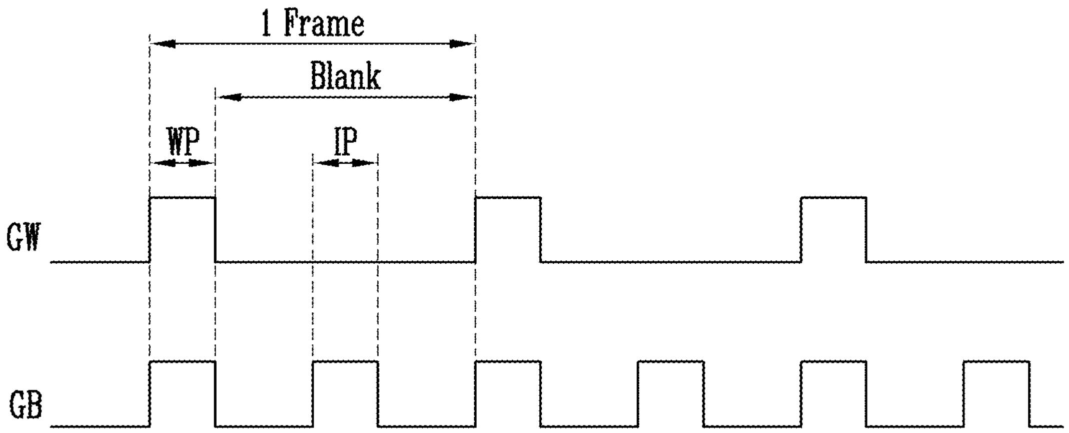
FIG. 5A is a timing diagram illustrating an initialization period included in one frame period, corresponding to a refresh rate, in accordance with an embodiment.
Figure 5B:
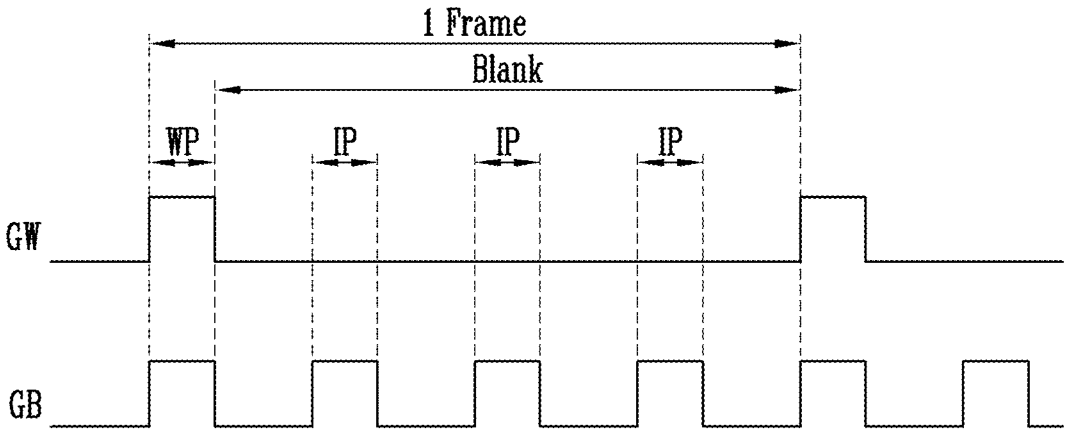
FIG. 5B is a timing diagram illustrating an initialization period included in one frame period, corresponding to a refresh rate, in accordance with an embodiment.

FIG. 4 is a timing diagram illustrating an example of a blank period corresponding to a refresh rate, according to an embodiment. FIGS. 5A and 5B are timing diagrams illustrating an embodiment of an initialization period included in one frame period which corresponds to a refresh rate. In FIGS. 5A and 5B, a data writing period WP and an initialization period IP are divided using the first scan signal GW and the fourth scan signal GB.

In an embodiment and referring to FIG. 4, an active period Active included in one frame may be set to have the same length regardless of refresh rates (or driving frequencies) and a blank period Blank included in one frame may be set to have different lengths, corresponding to refresh rates.

In an example, an active period included in a refresh rate of 120 Hz and an active period included in a refresh rate of 60 Hz may be set to the same length (i.e., width or time). The active period may mean a period in which a data signal is supplied during one frame period and a data writing period WP may be included in the active period.

In another example, a blank period included in the refresh rate of 120 Hz and a blank period included in the refresh rate of 60 Hz may be set to have different lengths (i.e., widths or times) and an initialization period IP may be included in the blank period.

In still another example, one initialization period IP may be included in the blank period, corresponding to the refresh rate of 120 Hz, as shown in FIG. 5A, and three initialization periods IP may be included in the blank period, corresponding to the refresh rate of 60 Hz, as shown in FIG. 5B (FIG. 5A may be set to a double refresh rate as compared with FIG. 5B).

In an embodiment, the number of initialization periods IP included in one frame period may vary corresponding to lengths of the blank period as shown in FIGS. 5A and 5B. In an example, as the length of the blank period becomes longer, a larger number of initialization periods IP may be included.

As such, when the number of initialization periods IP is differently set corresponding to lengths of the blank period, the display device can be driven at various refresh rates. That is, the pixels PX can be turned off in certain period regardless of refresh rates (or regardless of lengths of the blank period), and accordingly, the display device can be driven at various refresh rates while maintaining display quality.

Figure 6:
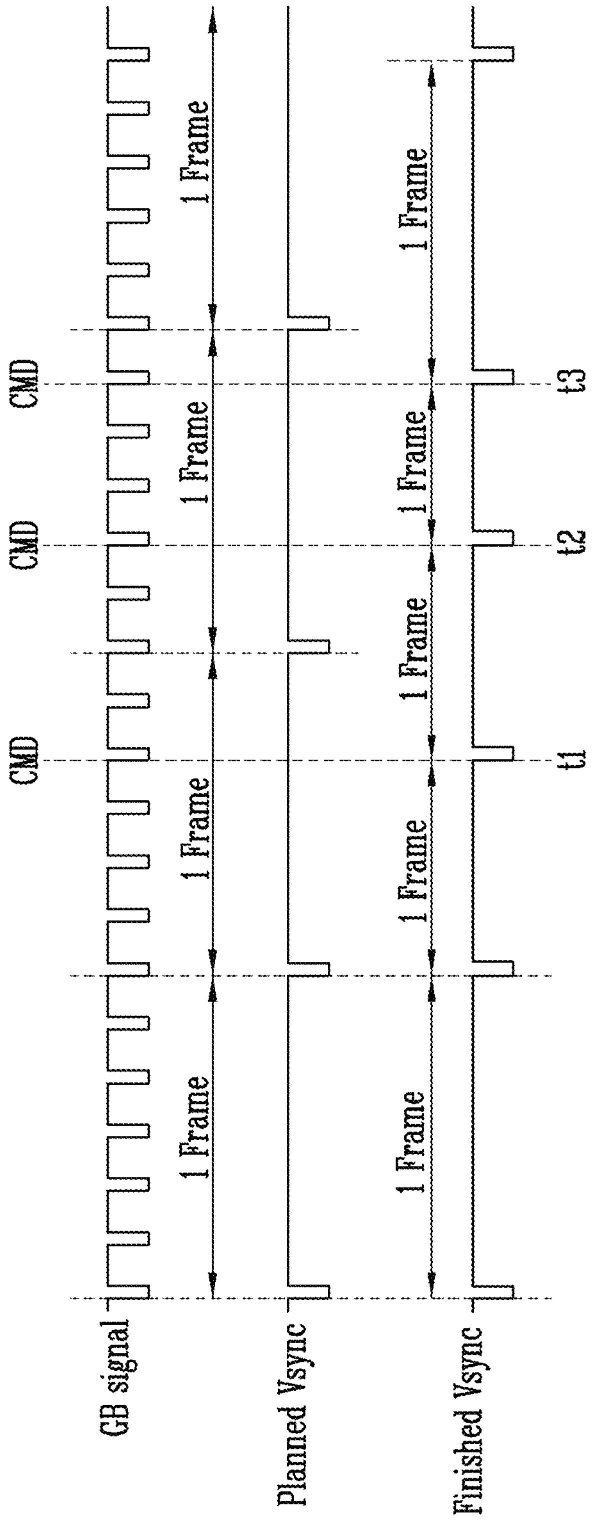
FIG. 6 is a timing diagram illustrating a method of driving the display device, in accordance with an embodiment.

FIG. 6 is a timing diagram illustrating a method of driving the display device, in accordance with an embodiment. In FIG. 6, the GB signal represents the fourth scan signal GB which may be supplied in a data writing period WP and an initialization period IP, and which may be supplied for each certain period. In FIG. 6, Planned Vsync may be a driving frequency (i.e., driving frequency or refresh rate) which is planned in the display device. The planned driving frequency may be a driving frequency predetermined in the timing controller 140 and which corresponds to various driving conditions of the display device. In FIG. 6, Finished Vsync may be an actual driving frequency of the display device where the actual driving frequency may be a frequency at which the display device is actually driven.

In an embodiment and referring to FIG. 6, the timing controller 140 may drive the display device at the planned driving frequency when the command data CMD is not input. In an example, when the command data CMD is not input to the timing controller 140, a frame of the display device may be shifted corresponding to the planned driving frequency.

When the command data CMD is input into the timing controller 140, a frame of the display device may be shifted. In an example, when the command data CMD (e.g., a dimming level change command, a frame variable command, a gamma change command, a sleep mode command, and the like) is input into the timing controller 140, the timing controller 140 may shift the frame of the display device (i.e., the timing controller 140 may drive the display device at the actual driving frequency).

In an example, when a first command (e.g., the dimming level change command) is input at a first time t1, the timing controller 140 may change a maximum luminance of the pixel unit 110 while shifting a frame (or changing a driving frequency). In an example, when a second command (e.g., the gamma change command) is input at a second time t2, the timing controller 140 may change a gamma voltage while shifting a frame. In an example, when a third command (e.g., an input data and frame variable command) is input at a third time t3, the timing controller 140 may display an image corresponding to input data in the pixel unit 110 while shifting a frame.

As described above, in the embodiment shown in FIG. 6, a frame may be shifted (or a driving frequency may be changed) whenever the command data CMD is input into the timing controller 140. The driving frequency of the display device may be frequently (or rapidly) changed, and accordingly, a large amount of power consumption may be required.

Figure 7:
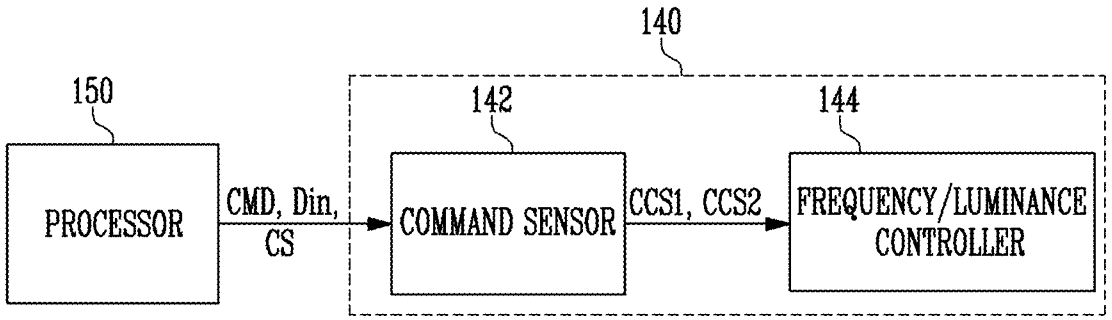
FIG. 7 is a schematic flow diagram illustrating a timing controller, in accordance with an embodiment.
Figure 8:
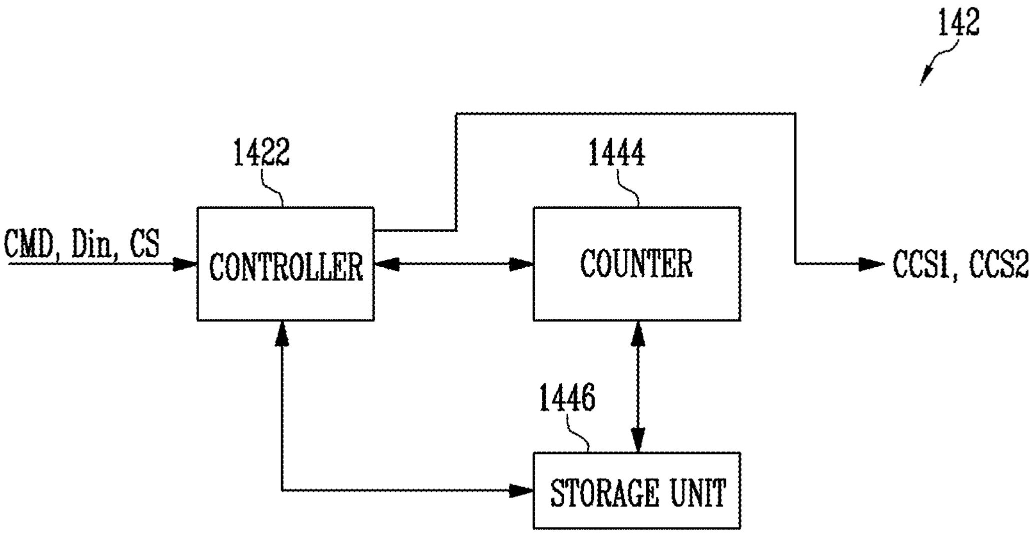
FIG. 8 is a schematic flow diagram illustrating an embodiment of a command sensor shown in FIG. 7, in accordance with an embodiment.

FIG. 7 is a block diagram illustrating a timing controller, in accordance with an embodiment. FIG. 8 is a block diagram illustrating an embodiment of a command sensor shown in FIG. 7. In FIG. 7, only components necessary for descriptions of the invention among various components included in the timing controller are illustrated.

In an embodiment and referring to FIG. 7, the timing controller 140 may include a command sensor 142 and a frequency/luminance controller 144.

The command sensor 142 may receive command data CMD and input data Din, which are input from the processor 150. The command sensor 142 may further receive a control signal CS input from the processor 150. The command sensor 142 may sense commands included in the command data CMD. Also, the command sensor 142 may compare a threshold value corresponding to each of the commands with an input number of each of the commands (or a count value of each of the commands).

In an embodiment, when a first command is included in the command data CMD, the command sensor 142 may compare a first threshold value corresponding to the first command with a first count value corresponding to the first command. In an example, when a second command is included in the command data CMD, the command sensor 142 may compare a second threshold value corresponding to the second command with a second count value corresponding to the second command.

In an embodiment, the first threshold value and the second threshold value may be equal to or different from each other. In an example, at least some of the threshold values corresponding to the respective commands may be set as the same value, while the others may be set as different values. In an example, the threshold values which correspond to the respective commands may be equal to or different from each other.

In an embodiment, the command sensor 142 may compare a command included in the command data CMD with a threshold value corresponding to the command, and supply a first command control signal CCS1 or a second command control signal CCS2 to the frequency/luminance controller 144, corresponding to a comparison result. To this end, the command sensor 142 may include a controller 1422, a counter 1444, and a storage unit 1446.

In an embodiment, threshold values corresponding to the respective commands and count values corresponding to the respective commands may be stored in the storage unit 1446. In an example, the first threshold value corresponding to the first command and the second threshold value corresponding to the second command may be stored in the storage unit 1446. In addition, the first count value corresponding to the first command and the second count value corresponding to the second command may be stored in the storage unit 1446. The first count value may correspond to an input number of the first command, and the second count value may correspond to an input number of the second command.

In an embodiment, the counter 1444 may generate a count value which corresponds to an input of the commands. In an example, when the first command is included in the command data CMD input to the controller 1422, the counter 1444 may increase the first count value under the control of the controller 1422. In an example, when the second command is included in the command data CMD input to the controller 1422, the counter 1444 may increase the second count value under the control of the controller 1422.

In an embodiment, the controller 1422 may receive the command data CMD and the input data Din, which are input from the processor 150. The controller 1422 (or the command sensor 142) may sense a command included in the command data CMD, and compare a threshold value corresponding to the command with a count value corresponding to the command.

In an example, the controller 1422 (or the command sensor 142) may compare the first count value and the first threshold value, which correspond to the first command included in the command data CMD. When the first count value is set less than the first threshold value, the controller 1422 (or the command sensor 142) may supply the first command control signal CCS1 to the frequency/luminance controller 144, where the first command control signal CCS1 may include the first command and/or the input data Din.

When the first count value is equal to the first threshold value, the controller 1422 (or the command sensor 142) may supply the second command control signal CCS2 to the frequency/luminance controller 144, where the second command control signal CCS2 may include the first command and/or the input data Din. The controller 1422 may output the second command control signal CCS2 (or supply the second command control signal CCS2 to the frequency/luminance controller 144), and then initialize the first count value. In an example, the controller 1422 may initialize the first count value to a value of "0."

In an embodiment, the controller 1422 (or the command sensor 142) may compare the second count value and the second threshold value, which correspond to the second command included in the command data CMD. When the second count value is set less than the second threshold value, the controller 1422 (or the command sensor 142) may supply the first command control signal CCS1 to the frequency/luminance controller 144, where the first command control signal CCS1 may include the second command and/or the input data Din.

When the second count value is equal to the second threshold value, the controller 1422 (or the command sensor 142) may supply the second command control signal CCS2 to the frequency/luminance controller 144, where the second command control signal CCS2 may include the second command and/or the input data Din. The controller 1422 may output the second command control signal CCS2 (or supply the second command control signal CCS2 to the frequency/luminance controller 144), and then initialize the second count value. In an example, the controller 1422 may initialize the second count value to the value of "0."

In an embodiment, the frequency/luminance controller 144 may receive the first command control signal CCS1 or the second command control signal CCS2, which is input from the command sensor 142. When the first command control signal CCS1 is input, the frequency/luminance controller 144 does not shift any frame but may perform an operation which corresponds to a command included in the first command control signal CCS1 corresponding to the planned driving frequency. In an example, when the first command is included in the first command control signal CCS1, the frequency/luminance controller 144 does not shift any frame but may perform an operation corresponding to the first command, corresponding to the planned driving frequency. In an example, the frequency/luminance controller 144 may change a maximum luminance of the display device, corresponding to the first command.

In an embodiment, when the second command control signal CCS2 is input, the frequency/luminance controller 144 may perform an operation corresponding to a command included in the second command control signal CCS2 while varying a frame regardless of the planned driving frequency. In an example, when the first command is included in the second command control signal CCS2, the frequency/luminance controller 144 may perform an operation corresponding to the first command while varying a frame. In an example, the frequency/luminance controller 144 may change the maximum luminance of the display device which corresponds to the first command.

In an embodiment, and as shown in FIG. 8, it is illustrated that the controller 1422, the counter 1444, and the storage unit 1446 are included in the command sensor 142. However, the invention is not limited thereto. In an example, at least some components (or functions) of the controller 1422, the counter 1444, and the storage unit 1446 may be included in the frequency/luminance controller 144.

Figure 9:
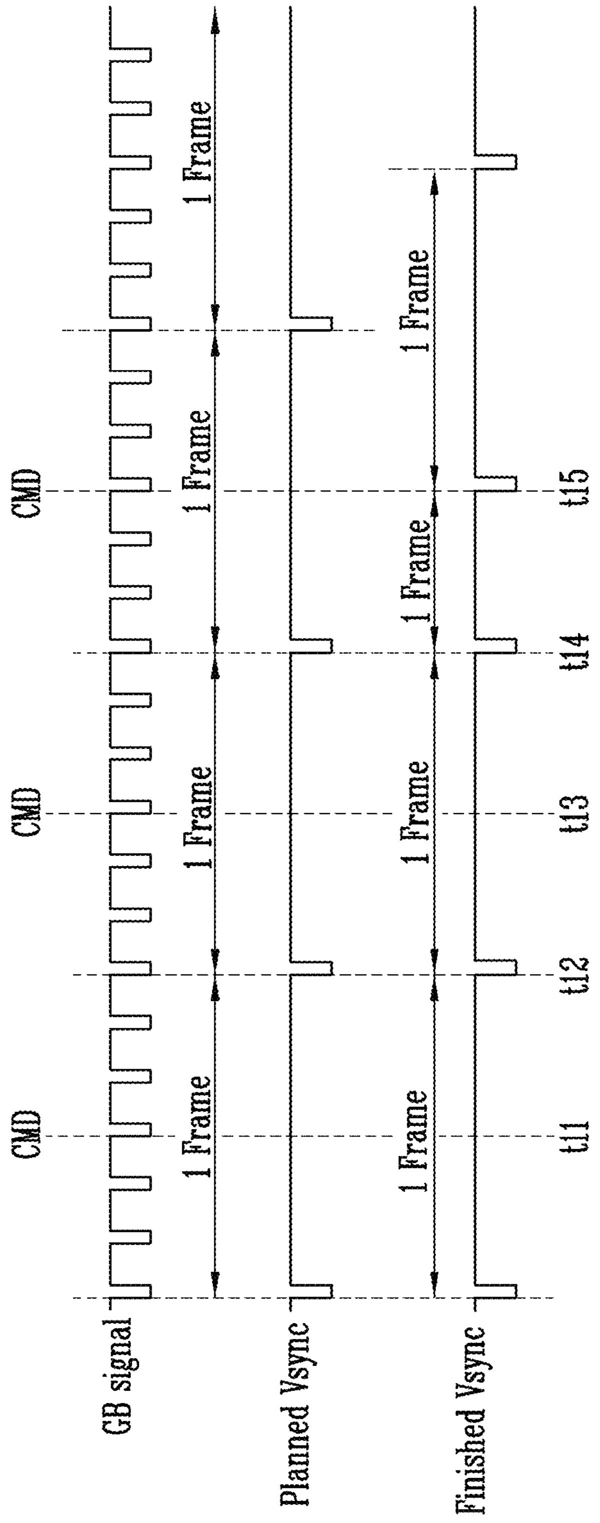
FIG. 9 is a timing diagram illustrating a method of driving the display device, in accordance with an embodiment.

FIG. 9 is a diagram illustrating a method of driving the display device, in accordance with an embodiment. In FIG. 9, the GB signal represents the fourth scan signal GB which may be supplied in a data writing period WP and an initialization period IP, and be supplied for each certain period. In FIG. 9, the Planned Vsync signal may be a planned driving frequency of the display device. In FIG. 9, the Finished Vsync signal may be an actual driving frequency of the display device, where the actual driving frequency may be a frequency at which the display device is actually driven.

In an embodiment and referring to FIGS. 7 to 9, when a first command (e.g., a dimming level command) is input at a first time t11, the counter 1444 may increase a first count value which corresponds to the first command by "1." In an example, when the first count value stored in the storage unit 1446 is set as "0," the first count value may be increased to a value of "1" at the first time t11.

The controller 1422 may compare the first count value with a first threshold value which corresponds to the first command stored in the storage unit 1446. When the first threshold value is set as "3," the controller 1422 may supply a first command control signal CCS1 to the frequency/luminance controller 144.

The frequency/luminance controller 144 supplied with the first command control signal CCS1 does not immediately shift a frame, but may shift the frame, corresponding to the planned driving frequency, at a second time t12. A maximum luminance of the display device may be changed corresponding to the first command at the second time t12.

When the first command (e.g., the dimming level command) is input at a third time t13, the counter 1444 may increase the first count value which corresponds to the first command by "1." In an example, the first count value stored in the storage unit 1446 may be increased to a value of "2" at the third time t13.

The controller 1422 may compare the first count value with the first threshold value corresponding to the first command stored in the storage unit 1446. Since the first threshold value is set as "3," the controller 1422 may supply the first command control signal CCS1 to the frequency/luminance controller 144.

The frequency/luminance controller 144 supplied with the first command control signal CCS1 does not immediately shift a frame, but may shift the frame, corresponding to the planned driving frequency, at a fourth time t14. The maximum luminance of the display device may be changed corresponding to the first command at the fourth time t14.

When the first command (e.g., the dimming level command) is input at a fifth time t15, the counter 1444 may increase the first count value which corresponds to the first command by "1." In an example, the first count value stored in the storage unit 1446 may be increased as "3" at the fifth time t15.

In an embodiment, the controller 1422 may compare the first count value with the first threshold value which corresponds to the first command stored in the storage unit 1446. Since the first threshold value is set as "3," the controller 1422 may supply the second command control signal CCS2 to the frequency/luminance controller 144. After the controller 1422 outputs the second command control signal CCS2, the controller 1422 may initialize the first count value to "0."

In an embodiment, the frequency/luminance controller 144 supplied with the second command control signal CCS2 may change the maximum luminance of the display device, corresponding to the first command, while shifting a frame at the fifth time t15.

In an embodiment, a second command (e.g., a frame variable command) may be input at the fifth time t15. When the second command is input at the fifth time t15, the counter 1444 may increase a second count value which corresponds to the second command by "1." In an example, when the second count value stored in the storage unit 1446 is set as "0," the second count value may be increased to the value of "1" at the fifth time t15.

In an embodiment, the controller 1422 may compare the second count value with a second threshold value corresponding to the first command stored in the storage unit 1446. When the second threshold value is set as "1," the controller 1422 may supply the second command control signal CCS2 to the frequency/luminance controller 144.

In an embodiment, the frequency/luminance controller 144 supplied with the second command signal CCS2 may shift the frame at the fifth time t15. Since the frame of the display device is shifted, an image corresponding to new input data Din may be displayed in the pixel unit 110 at the fifth time t15.

As described above, in an embodiment, a threshold value corresponding to each of the commands included in the command data CMD is set, and a frame change number (driving frequency change number, or refresh rate change number) of the display device is changed corresponding to the threshold value. Thus, the driving frequency (or refresh rate) of the display device can be prevented from being changed frequently, and accordingly, power consumption can be reduced or minimized.

Additionally, threshold values of the display device may be stored in the storage unit 1446, and may be updated by the processor 150. In an example, when the threshold values are all set as "1," the driving frequency of the display device may be changed whenever the command data is input as shown in FIG. 6. That is, in an embodiment, the threshold values stored in the storage unit 1446 are controlled, so that the frame change number of the display device can be controlled.

Figure 10:
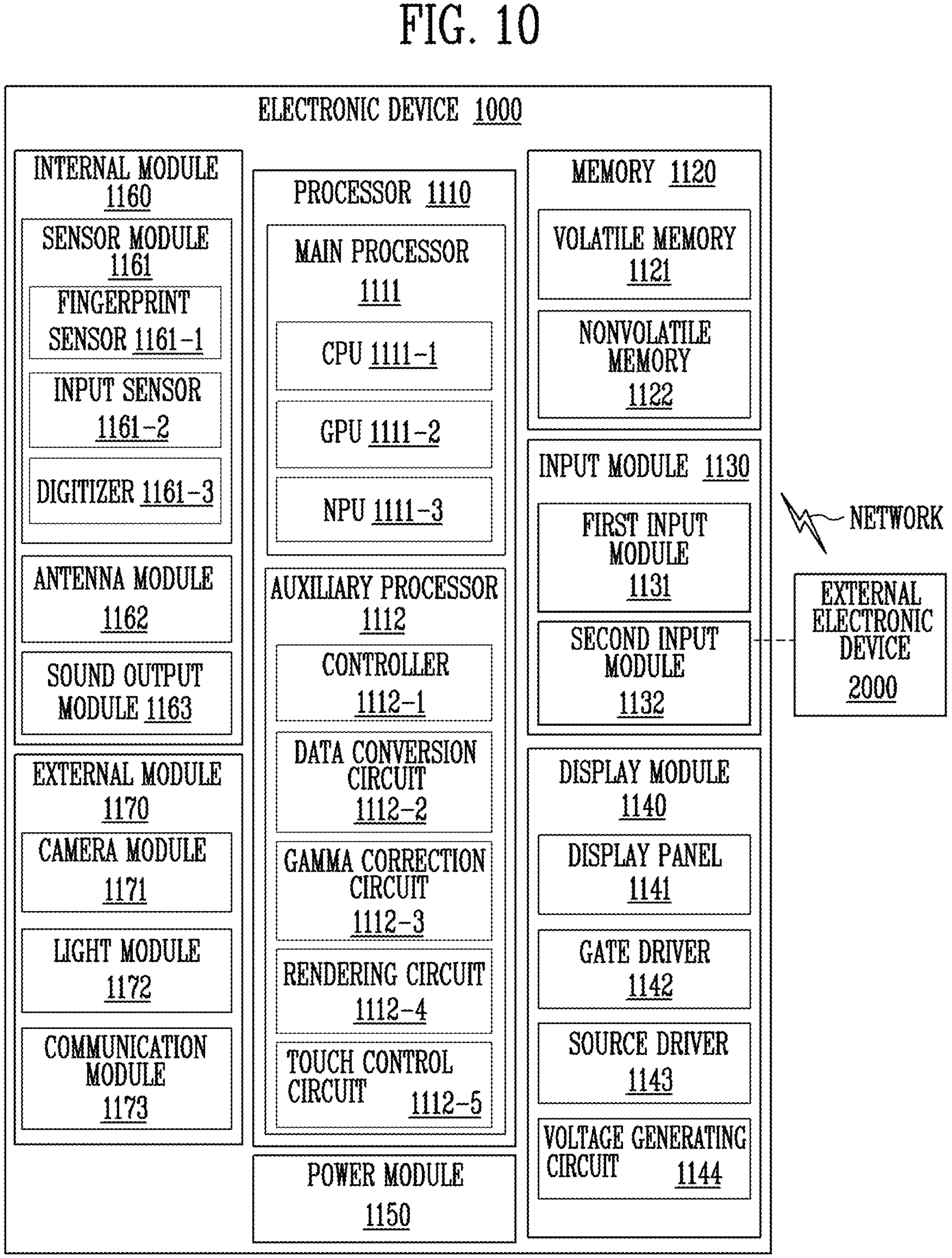
FIG. 10 is a diagram illustrating an electronic device, in accordance with an embodiment.

FIG. 10 is a block diagram illustrating an electronic device, in accordance with an embodiment.

In an embodiment and referring to FIG. 10, the electronic device 1000 may output various information through a display module 1140, such that when a processor 1110 executes an application stored in a memory 1120, the display module 1140 may provide application information to a user through a display panel 1141.

In an embodiment, the processor 1110 may acquire an external input through an input module 1130 or a sensor module 1161, and execute an application corresponding to the external input. For example, when the user selects a camera icon (or camera application icon) displayed on the display panel 1141, the processor 1110 may acquire a user input through an input sensor 1161-2, and activate a camera module 1171. The processor 1110 may transfer, to the display module 1140, image data corresponding to a photographed image acquired through the camera module 1171. The display module 1140 may display an image corresponding to the photographed image through the display panel 1141.

In another embodiment, when personal information authentication is executed in the display module 1140, a fingerprint sensor 1161-1 may acquire input fingerprint information as input data. The processor 1110 may compare the input data acquired through the fingerprint sensor 1161-1 with authentication data stored in the memory 1120, and execute an application according to a comparison result. The display module 1140 may display information executed according to a logic of the application through the display panel 1141. The fingerprint sensor 1161-1 may be disposed to acquire fingerprint information in the entire area of the display panel 1141.

In still another embodiment, when a music streaming icon displayed on the display module 1140 is selected, the processor 1110 may acquire a user input through the input sensor 1161-2, and activate a music streaming application stored in the memory 1120. When a music play command is input in the music streaming application, the processor 1110 may activate a sound output module 1163, thereby providing the user with sound information which accords with the music play command.

In the above, operations of the electronic device 1000 have been briefly described. Hereinafter, components of the electronic device 1000 will be described in detail. Some of the components of the electronic device 1000, which will be described later, may be integrated to be provided as one component, and one component may be separated into two or more components to be provided.

In an embodiment, the electronic device 1000 may communicate with an external electronic device 2000 through a network (e.g., a short-range wireless communication network or a long-range wireless communication network). In accordance with an embodiment, the electronic device 1000 may include the processor 1110, the memory 1120, the input module 1130, the display module 1140, a power module 1150, an internal module 1160, and an external module 1170. In accordance with an embodiment, in the electronic device 1000, at least one of the above-described components may be omitted, or one or more other components may be added. In accordance with an embodiment, some components (e.g., the sensor module 1161, an antenna module 1162, and/or the sound output module 1163) among the above-described components may be integrated in another component (e.g., the display module 1140).

In an embodiment, the processor 1110 may control at least another component (e.g., a hardware or software component) of the electronic device 1000, which is connected to the processor 1110, by executing software, and perform various processing or calculations. In accordance with an embodiment, as at least a portion of the data processing and calculations, the processor 1110 may store, in a volatile memory 1121, a command or data, received from another component (e.g., the input module 1130, the sensor module 1161, or a communication module 1173), process the command or data, stored in the volatile memory 1121, and store result data in a nonvolatile memory 1122. The processor 1110 may be the processor 150 shown in FIG. 1.

The processor 1110 may include a main processor 1111 and an auxiliary processor 1112, where the main processor 1111 may include a central processing unit (CPU) 1111-1. The main processor 1111 may further include at least one of a graphic processing unit (GPU) 1111-2, a communication processor (CP), and an image signal processor (ISP). The main processor 1111 may further include a neural processing unit (NPU) 1111-3, where the NPU 1111-3 is a processor specified for processing an artificial intelligence (AI) model, and the AI model may be generated through machine learning. The AI model may include a plurality of artificial neural network layers. An artificial neural network may be a deep neural network (DNN), a convolutional neural network (CNN), a recurrent neural network (RNN), a restricted boltzman machine (RBM), a deep belief network (DBN), a bidirectional recurrent deep neural network (BRDNN), a deep Q-networks, or one of two or more combinations thereof, but the invention is not limited to the above-described example. The AI model may additionally or alternatively include a software structure, in addition to a hardware structure. At least two of the above-described processing units and the above-described processors may be implemented into one integrated component (e.g., a single chip), or be implemented as components (e.g., a plurality of chips) independent from each other.

In an embodiment, the auxiliary processor 1112 may include a controller 1112-1. The controller 1112-1 may include an interface conversion circuit and a timing control circuit. In an example, the auxiliary processor 1112 may include the timing controller 140 shown in FIG. 1. In an embodiment, the auxiliary processor 1112 may include the command sensor 142 and the frequency/luminance controller 144, which are shown in FIG. 7. In an example, the auxiliary processor 1112 may include the controller 1422, the counter 1444, and the storage unit 1446, which are shown in FIG. 8. At least some functions (or components) of the timing controller 140 may be included in the controller 1112-1, a data conversion circuit 1112-2, a gamma correction circuit 1112-3, a rendering circuit 1112-4, and the like.

The controller 1112-1 may receive an image signal from the main processor 1111, and convert a data format of the image signal to be suitable for interface specifications with the display module 1140, thereby outputting image data. The controller 1112-1 may output various control signals necessary for driving of the display module 1140.

In an embodiment, the auxiliary processor 1112 may further include the data conversion circuit 1112-2, the gamma correction circuit 1112-3, the rendering circuit 1112-4, a touch control circuit 1112-5, and the like. The data conversion circuit 1112-2 may receive image data from the controller 1112-1 and may compensate for the image data such that an image is displayed with a desired luminance according to a characteristic of the electronic device 1000 or a setting of the user or convert the image data for the purpose of reduction of power consumption, afterimage compensation, or the like.

In an embodiment, the gamma correction circuit 1112-3 may convert image data, a gamma reference voltage, or the like such that an image displayed in the electronic device 1000 has a desired gamma characteristic. The rendering circuit 1112-4 may receive image data from the controller 1112-1, and render the image data by considering a pixel arrangement of the display panel 1141, and the like, applied to the electronic device 1000.

In an embodiment, the touch control circuit 1112-5 may supply a touch signal to the input sensor 1161-2, and may be supplied with a sensing signal from the input sensor 1161-2, corresponding to the touch signal.

In an embodiment, at least one of the data conversion circuit 1112-2, the gamma correction circuit 1112-3, the rendering circuit 1112-4, and the touch control circuit 1112-5 may be integrated in another component (e.g., the main processor 1111 or the controller 1112-4). At least one of the data conversion circuit 1112-2, the gamma correction circuit 1112-3, and the rendering circuit 1112-4 may be integrated into a source driver 1143 which will be described later.

In an embodiment, the memory 1120 may store various data used by at least one component (e.g., the processor 1110 or the sensor module 1161) of the electronic device 1000 and input or output data about a command associated therewith. Also, various setting data corresponding to the setting of the user the memory 1120. The memory 1120 may include at least one of the volatile memory 1121 and the nonvolatile memory 1122.

In an embodiment, the input module 1130 may receive a command or data to be used in a component (e.g., the processor 1110, the sensor module 1161, or the sound output module 1163) of the electronic device 1000 from the outside (e.g., the user or the external electronic device 2000) of the electronic device 1000.

The input module 1130 may include a first input module 1131 to which a command or data is input from the user and a second input module 1132 to which a command or data is input from the external electronic device 2000. The first input module 1131 may include a microphone, a mouse, a keyboard, a key (e.g., a button), or a pen (e.g., a passive pen or an active pen). The second input module 1132 may support a specified protocol capable of connecting the electronic device 1000 to the external electronic device 2000 by wired or wireless. In accordance with an embodiment, the second input module 1132 may include a high definition multimedia interface (HDMI), a universal serial bus (USB) interface, an SD card interface, or an audio interface. The second input module 1132 may include a connector, e.g., an HDMI connector, a USB connector, an SD card connector, or an audio connector (e.g., a headphone connector), which can physically connect the electronic device 1000 to the external electronic device 2000.

In an embodiment, the display module 1140 may visually provide information to the user. The display module 1140 may include the display panel 1141, a gate driver 1142, the source driver 1143, and a voltage generating circuit 1144. The display module 1140 may further include a window for protecting the display panel 1141, a chassis, and a bracket. The display module 1140 may include at least some components of the display device shown in FIG. 1.

The display panel 1141 (or display) may include a liquid crystal display panel, an organic light emitting display panel, or an inorganic light emitting display panel, and the kind of the display panel 1141 is not limited. The display panel 1141 may be of a rigid type or a flexible type in which the display panel 1141 is rollable or foldable. The display module 1140 may further include a supporter for supporting the display panel 1141, a bracket, a heat dissipation member, or the like. The display panel 1141 may include the pixel unit 110 shown in FIG. 1.

In an embodiment, the gate driver 1142 is a driving chip, and may be mounted in the display panel 1141. Also, the gate driver 1142 may be integrated in the display panel 1141. For example, the gate driver 1142 may include an Amorphous Silicon TFT Gate (ASG) driver circuit, a Low Temperature Polycrystalline Silicon (LTPS) TFT gate driver circuit, or an Oxide Semiconductor TFT Gate (OSG) driver circuit, which is embedded in the display panel 1141. The gate driver 1142 may receive a control signal from the controller 1112-1, and output scan signals to the display panel 1141 in response to the control signal. The gate driver 1142 may include the scan driver 130 shown in FIG. 1.

In an embodiment, the display module 1140 may further include an emission driver. The emission driver may output an emission control signal to the display panel 1141 in response to a control signal received from the controller 1112-1. The emission driver may be formed separately from the gate driver 1142, or it may be integrated in the gate driver 1142.

In an embodiment, the source driver 1143 may receive a control signal from the controller 1112-1, and convert the image data into an analog voltage (e.g., a data voltage) and then output data voltages to the display panel 1141 in response to the control signal. The source driver 1143 may include the data driver 120 shown in FIG. 1.

The source driver 1143 may be integrated in with another component (e.g., the controller 1112-1). Functions of the interface conversion circuit and the timing control circuit of the controller 1112-1, which are described above, may be integrated in the source driver 1143. The voltage generating circuit 1144 may output various voltages necessary for driving of the display panel 1141.

In an embodiment, the source driver 1143 may convert data corresponding to red (R), green (G), and blue (B), included in image data received from the processor 1110, into a red data signal (or data voltage), a green data signal, and a blue data signal, and provide the red data signal, the green data signal, and the blue data signal to a plurality of pixel columns included in the display panel 1141 during one horizontal period.

In an embodiment, the power module 1150 may supply power to at least one component of the electronic device 1000, where the power module 1150 may include a battery for charging a power voltage. The battery may include a primary cell which is not rechargeable, a secondary cell which is rechargeable, or a fuel cell. The power module 1150 may include a power management integrated circuit (PMIC). The PMIC may supply an optimized power source to each of the above-described modules and modules which will be described later. The power module 1150 may include a wireless power transmission/reception member electrically connected to the battery. The wireless power transmission/reception member may include a plurality of coil-shaped antenna radiators. In an embodiment, at least some components of the power module 1150 and the voltage generating circuit 1144 may be integrated to be provided as one component. In an example, the voltage generating circuit 1144 may be included in the power module 1150.

In an embodiment, the electronic device 1000 may further include the internal module 1160 and the external module 1170. The internal module 1160 may include the sensor module 1161, the antenna module 1162, and the sound output module 1163. The external module 1170 may include the camera module 1171, a light module 1172, and the communication module 1173.

The sensor module 1161 may sense an input caused by a body of the user or an input caused by a pen in the first input module, and generate an electrical signal or a data value, which corresponds to the input. The sensor module 1161 may include at least one of the fingerprint sensor 1161-1, the input sensor 1161-2, and a digitizer 1161-3.

The fingerprint sensor 1161-1 may generate a data value corresponding to a fingerprint of the user.

The input sensor 1161-2 may generate a data value corresponding to coordinate information of the input caused by the body of the user or the input caused by the pen. The input sensor 1161-2 may generate, as a data value, a capacitance variation caused by the input. The input sensor 1161-2 may sense an input caused by a passive pen or transmit/receive data to/from an active pen.

The input sensor 1161-2 may measure a biometric signal such as pressure, moisture or body fat. For example, when the user does not move for a constant time while a body part of the user is in contact with a sensor layer or a sensing panel, the input sensor 1161-2 may output information which the user wants to the display module 1140 by sensing a biometric signal, based on a change in electric field, caused by the body part.

The digitizer 1161-3 may generate a data value corresponding to the coordinate information of the input caused by the pen. The digitizer 1161-3 may generate, as a data value, an electromagnetic variation caused by the input. The digitizer 1161-3 may sense an input caused by the passive pen, or transmit/receive data to/from the active pen.

At least one of the fingerprint sensor 1161-1, the input sensor 1161-2, and the digitizer 1161-3 may be implemented as a sensor layer formed on the display panel 1141 through a continuous process. At least one of the fingerprint sensor 1161-1, the input sensor 1161-2, and the digitizer 1161-3 may be disposed at an upper side of the display panel 1141, and any one, e.g., the digitizer 1161-3 among the fingerprint sensor 1161-1, the input sensor 1161-2, and the digitizer 1161-3 may be disposed at a lower side of the display panel 1141.

At least two of the fingerprint sensor 1161-1, the input sensor 1161-2, and the digitizer 1161-3 may be formed to be integrated into one sensing panel through the same process. When at least two of the fingerprint sensor 1161-1, the input sensor 1161-2, and the digitizer 1161-3 are integrated into one sensing panel, the sensing panel may be disposed between the display panel 1141 and the window disposed at an upper side of the display panel 1141. In accordance with an embodiment, the sensing panel may be disposed on the window, and the position of the sensing panel is not particularly limited.

At least one of fingerprint sensor 1161-1, the input sensor 1161-2, and the digitizer 1161-3 may be built in the display panel 1141. That is, at least one of fingerprint sensor 1161-1, the input sensor 1161-2, and the digitizer 1161-3 may be simultaneously formed through a process of forming elements (e.g., a light emitting element, a transistor, and the like) included in the display panel 1141.

In an embodiment, the sensor module 1161 may generate an electrical signal or a data value, which corresponds to an internal state or an external state of the electronic device 1000. The sensor module 1161 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

In an embodiment, the antenna module 1162 may include one or more antennas for transmitting a signal or power to the outside or receiving a signal or power from the outside. In accordance with an embodiment, the communication module 1173 may transmit a signal to the external electronic device or receive a signal from the external electronic device through an antenna suitable for a communication scheme. An antenna pattern of the antenna module 1162 may be integrated in one component (e.g., the display panel 1141) of the display module 1140, the input sensor 1161-2, or the like.

In an embodiment, the sound output module 1163 is a device for outputting a sound signal to the outside of the electronic device 1000, and may include, for example, a speaker used for a general purpose such as multimedia playback or transcription playback and a receiver used for only call reception. In accordance with an embodiment, the receiver may be integrally formed with the speaker or be formed separately from the speaker. A sound output pattern of the sound output module 1163 may be integrated in the display module 1140.

In an embodiment, the camera module 1171 may photograph a still image and a moving image. In accordance with an embodiment, the camera module 1171 may include one or more lenses, an image sensor, or an image signal processor. The camera module 1171 may further include an infrared camera capable of measuring existence of the user, a position of the user, eyes of the user, or the like.

In an embodiment, the light module 1172 may provide light. The light module 1172 may include a light emitting diode or a xenon lamp. The light module 1172 may operate in linkage with the camera module 1171 or operate independently from the camera module 1171.

In an embodiment, the communication module 1173 may establish a wired or wireless communication channel between the electronic device 1000 and the external electronic device 2000, and support communication performance through the established communication channel. The communication module may include any one or all of a wireless communication module such as a cellular communication module, a short-range wireless communication module, or a global navigation satellite system (GNSS) communication module, and a wired communication module such as a local area network (LAN) communication module or a power line communication (PLC) module. The communication module 1173 may communicate with the external electronic device 2000 through a short-range communication network such as Bluetooth™, wireless-fidelity (WiFi) direct, or infrared data association (IrDA), or a long-range communication network such as a cellular network, Internet, or a computer network (e.g., LAN or wide area network (WAN)). The above-described several kinds of communication modules may be implemented into one chip or be respectively implemented as separate chips.

In an embodiment, the input module 1130, the sensor module 1161, the camera module 1171, and the like may be used to control an operation of the display module 1140 in connection with the processor 1110.

In an embodiment, the processor 1110 may output a command or data to the display module 1140, the sound output module 1163, the camera module 1171, or the light module 1172, based on input data received from the input module 1130. For example, the processor 1110 may generate image data, corresponding to input data applied through a mouse, an active pen, or the like, and output the image data to the display module 1140. In another embodiment, the processor 1110 may generate command data, corresponding to the input data, and output the command data to the camera module 1171 or the light module 1172. When no input data is received from the input module 1130, the processor 1110 may change the operation mode of the electronic device 1000 to a low power mode or a sleep mode, thereby reducing power consumed in the electronic device 1000.

The processor 1110 may output a command or data to the display module 1140, the sound output module 1163, the camera module 1171, or the light module 1172, based on sensing data received from the sensor module 1161. For example, the processor 1110 may compare authentication data applied by the fingerprint sensor 1161-1 with authentication data stored in the memory 1120, and then execute an application according to a comparison result. The processor 1110 may execute a command or output corresponding image data to the display module 1140, based on sensing data sensed by the input sensor 1161-2 or the digitizer 1161-3. When a temperature sensor is included in the sensor module 1161, the processor 1110 may receive temperature data about a temperature measured from the sensor module 1161, and further perform luminance correction on image data, based on the temperature data.

The processor 1110 may receive measurement data about the existence of the user, a position of the user, eyes of the user, or the like from the camera module 1171. The processor 1110 may further perform luminance correction on the image data, based on the measurement data. For example, the processor 1110 which decides the existence of the user through an input from the camera module 1171 may output image data of which luminance is corrected to the display module 1140 through the data conversion circuit 1112-2 or the gamma correction circuit 1112-3.

In an embodiment, at least some of the above-described components may be connected to each other and may communicate signals (e.g., commands or data) therebetween through an inter-peripheral communication scheme, e.g., a bus, a general purpose input/output (GPIO), a serial peripheral interface (SPI), a mobile industry processor interface (MIPI), or an ultra path interconnect (UPI) link. The processor 1110 may communicate with the display module 1140 through an appointed interface and may use any one of the above-described communication schemes. However, the invention is not limited to the above-described communication schemes.

In the display device and the method of driving the same, and the electronic device, in accordance with an embodiment, a threshold value corresponding to each of commands is set, and a frame is immediately shifted (or a driving frequency is changed) when an input number of the command is equal to the threshold value. Thus, a driving frequency change of the display device, which is caused by an input of the commands, can be minimized, and accordingly, power consumption can be reduced.

Example embodiments have been disclosed herein, and although specific terms are employed, they are used and are to be interpreted in a generic and descriptive sense only and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention.

What is claimed is:

1. A display device comprising:

a pixel unit including pixels connected to data lines and scan lines; and a timing controller configured to compare input numbers of commands included in command data with threshold values which corresponds to the input numbers, and shift or maintain a frame, which corresponds to a comparison result, wherein the frame is shifted by having an actual driving frequency in place different from a predetermined planned driving frequency.

2. The display device of claim 1, wherein, when a first command is input, the timing controller does not shift the frame when an input number of the first command is not equal to a first threshold value which corresponds to the first command.

3. The display device of claim 2, wherein the timing controller shifts a frame, which corresponds to the predetermined planned driving frequency, and reflects the first command when the frame is shifted.

4. The display device of claim 1, wherein, when a first command is input, the timing controller shifts the frame such that the first command is reflected when an input number of the first command is equal to a first threshold value which corresponds to the first command.

5. The display device of claim 1, wherein the commands include at least one of a dimming level change command which corresponds to a maximum luminance change of the pixel unit, a frame variable command which corresponds to a frame shift, a gamma change command which corresponds to a gamma voltage change, and a sleep mode command which corresponds to a low power mode.

6. The display device of claim 1, wherein the timing controller includes:

a command sensor configured to receive the command data and input data, and sense the commands included in the command data; and a frequency/luminance controller configured to shift or maintain the frame, which corresponds to a first command control signal or a second command control signal, which is supplied from the command sensor.

7. The display device of claim 6, wherein the command sensor includes:

a storage unit configured to store count values and the threshold values, which correspond to the input numbers of the commands;

a counter configured to increase a count value which corresponds to each of the commands when the commands are input; and a controller configured to compare the count values which corresponds to the respective commands with the corresponding threshold values, and output the first command control signal or the second command control signal, which corresponds to a comparison result.

8. The display device of claim 7, wherein the controller:

compares a first count value which corresponding to a first command included in the commands with a first threshold value which corresponds to the first command when the first command is input; and outputs the first command control signal when the first count value is less than the first threshold value, and outputs the second command control signal when the first count value and the first threshold value are the same.

9. The display device of claim 8, wherein the frequency/luminance controller does not shift the frame when the first command control signal is input.

10. The display device of claim 9, wherein the frequency/luminance controller shifts a frame, which corresponds to the predetermined planned driving frequency when the first command control signal is input, and reflects the first command when the frame is shifted.

11. The display device of claim 8, wherein the frequency/luminance controller reflects the first command while shifting a frame when the second command control signal is input.

12. The display device of claim 8, wherein the controller initializes the first count value when the second command control signal is output.

13. The display device of claim 1, further comprising:

a data driver configured to drive the data lines, under the control of the timing controller; and a scan driver configured to drive the scan lines under the control of the timing controller.

14. A method of driving a display device, the method comprising:

inputting a first command to a timing controller;

comparing an input number of the first command with a first threshold value; and shifting a frame of the display device when the input number of the first command and the first threshold value are the same, and not shifting the frame when the input number of the first command and the first threshold value are not the same, wherein the frame is shifted by having an actual driving frequency in place different from a predetermined planned driving frequency.

15. The method of claim 14, wherein, when the first command and the first threshold value are not the same, the timing controller shifts the frame, which corresponds to a predetermined planned driving frequency, and reflects the first command when the frame is shifted.

16. The method of claim 14, further comprising initializing the input number of the first command when the input number of the first command and the first threshold value are the same.

17. The method of claim 14, wherein the first threshold value is stored in a storage unit of the timing controller, and is changeable by an external processor.

18. An electronic device comprising:

a display module configured to display a predetermined image;

an auxiliary processor configured to control the display module; and a processor configured to command data to the auxiliary processor, wherein the auxiliary processor compares input numbers of commands included in the command data with threshold values which correspond to the input numbers, and shifts or maintains a frame of the display module, which correspond to a comparison result, wherein the frame is shifted by having an actual driving frequency in place different from a predetermined planned driving frequency.

19. The electronic device of claim 18, wherein, when a first command is input, the auxiliary processor shifts a frame, which corresponds to the predetermined planned driving frequency when an input number of the first command and a first threshold value which corresponds to the first command are not the same, and reflects the first command when the frame is shifted.

20. The electronic device of claim 18, wherein, when a first command is input, the auxiliary processor reflects the first command while shifting a frame when an input number of the first command and a first threshold value which corresponds to the first command are the same.

* * * * *